INVENTOR
nicolaas bohlmeijer
BY
Frank R. Trifari
AGENT

March 1, 1966 N. BOHLMEIJER 3,238,306

AVAILABILITY MEMORY FOR TELECOMMUNICATION SWITCHING LINKS

Filed Oct. 7, 1959 3 Sheets-Sheet 2

INVENTOR
nicolaas bohlmeijer
BY
Frank R. Trifari
AGENT

March 1, 1966 N. BOHLMEIJER 3,238,306

AVAILABILITY MEMORY FOR TELECOMMUNICATION SWITCHING LINKS

Filed Oct. 7, 1959 3 Sheets-Sheet 3

INVENTOR nicolaas bohlmeijer

BY Frank R. Jifani

AGENT

United States Patent Office 3,238,306
Patented Mar. 1, 1966

3,238,306

AVAILABILITY MEMORY FOR TELECOMMUNICATION SWITCHING LINKS

Nicolaas Bohlmeijer, Hilversum, Netherlands, assignor to North American Philips Company, Inc., New York, N.Y., a corporation of Delaware Filed Oct. 7, 1959, Ser. No. 845,018
Claims priority, application Netherlands, Oct. 7, 1958, 232,027
10 Claims. (Cl. 179—18)

This invention relates to a memory for storing the (free or busy) states of the links in the switching network of a telecommunication exchange. In the memory each binary memory element corresponds to a link of the switching network, while each input of this network can be connected to each output by means of a number of channels which are distinguished from one another by means of channel numbers and comprise a number of links which are connected in series to one another through switches of the switching network. The switching network is designed so that the co-ordinates of the addresses of the links which together form a channel between a certain input and a certain output, depend according to a fixed law upon the channel number concerned and upon the co-ordinates of the addresses of the input and the output concerned. The term "switching network of a telecommunication exchange," as used herein is to be understood to mean the part of the exchange through which the speech or telegraphy signals pass. The switching network has a number of inputs and a number of outputs, while between each output and each input a number of connections can be established which are referred to as channels in this specification. The switching network is built up from a number of switches which are connected to one another by means of wires which are referred to as links. The term "switch" is used herein to denote a component part of the switching network having a number of inputs and a number of outputs and designed so that each input can be connected to each output, and which cannot be considered to be built up of component parts having the same property. Examples of such switches are the cross bar switch, the switching matrix, a group of rotary selectors with multiples bank contacts, etc. The manner in which such a switch can be controlled, that is to say, the manner in which a connection can be established in the switch between an input and an output, depends upon the nature of that switch but is immaterial for the invention. Thus, a channel comprises a number of links which are connected in series through contacts of the switches. If in the switching network only single wire channels can be built up, as is usually the case in electronic switching networks, it may be undesirable or even impossible to deduce the state of a link from that link itself, for example, by measuring the voltage of that link or the current passing through it. In this event, the exchange must be provided with a memory, hereinafter referred to as a link memory system, in which the instantaneous states of the links are recorded. Each link corresponds to a binary memory element of the link memory. The functions which the link memory system must be able to fulful, are the following:

(1) Upon reception of the data of a certain input and a certain output of the switching network, the link memory must give information about a number of links, which together form a free channel between that input and that output, or, as the case may be, it must produce a signal which indicates that none of the channels between that input and that output is free.

(2) Upon reception of the data of a certain input and a certain output and of a channel number, the link memory must be capable of recording busy or free the links of the channel, between said input and output and having said channel number.

The inputs, outputs and links of a switching network can always be indicated by sets of a number (for example, three or four) of natural numbers. These sets are called the addresses of these inputs, outputs and links, the natural numbers comprising an address are called co-ordinates. The various channels existing between a certain input and a certain output are distinguished from one another by channel numbers. In order that the invention may be carried into effect, the switching network must be designed so that the coordinates of the addresses of the links which together form a channel between a certain input and a certain output of the switching network, depend according to a fixed law upon the channel number and the co-ordinates of the addresses of this input and output. According to the invention, the memory elements corresponding to the links of which the addresses differ from one another only in the coordinate which corresponds to the channel number, are connected to one another by means of a common reading out wire. Groups of memory elements (or, as the case may be, all the memory elements) which correspond to links having the same channel number, are connected to a common signal wire. The assembly is designed so that a current pulse of value $i$ which drives to the state 1 can be passed through the reading-out wire or, as the case may be, the system of reading-out wires which relates to the links of the channels which connect an arbitrary input to an arbitrary output of that switching network. Furthermore each individual memory element can be set in known manner (for example by coincidence) to the state 0 or the state 1. The term "reading-out wire" is used herein to denote a wire or other control member through which or by which a signal can be sent to a memory element concerned so that this provides its information. The word "common" is to be considered to refer both to the case where the memory elements concerned receive the read-out signal in series and to the case where they receive this signal in parallel. The memory elements which, through a read-out wire, receive the read-out signal, can give their information either simultaneously or in a certain sequence.

In order that the invention may readily be carried out, an embodiment thereof will now be described, by way of example, with reference to the accompanying diagrammatic drawings, in which.

Figure 1:
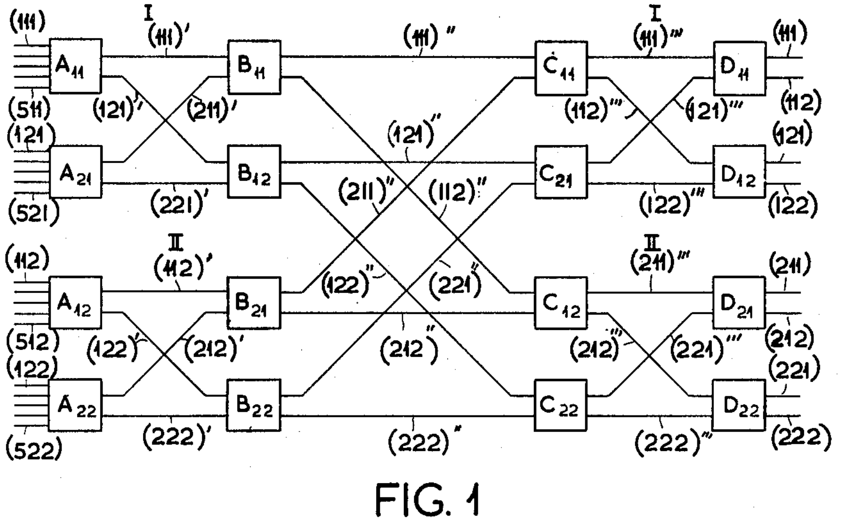
FIG. 1 shows the fundamental structure of a switching network comprising switching matrices which satisfies the above requirements.

The switching network shown diagrammatically in FIG. 1 comprises sixteen switching matrices which may be of the types described in co-pending patent specification Serial No. 673,642, filed July 23, 1957, now Patent No. 3,030,353.

The switches are indicated by square blocks and are subdivided into four stages. The switches of one and the same stage are designated by a capital letter (A, B, C or D) provided with two indices. The switches of the A- and B-stages are subdivided into two groups of two A- and two B-switches each. These groups are referred to as AB-groups and are denoted by the roman numerals I and II. Similarly, the switches of the C- and D-stages are subdivided into two CD-groups of two C- and two D-switches each. The numeration of the switches is as follows: $A_{yz}$ is the $y^{th}$ A-switch of the $z^{th}$ AB-group; $B_{ab}$ is the $b^{th}$ B-switch of the $a^{th}$ AB-group; $C_{cd}$ is the $c^{th}$ C-switch of the $d^{th}$ CD-group; $D_{uv}$ is the $v^{th}$ D-switch of the $u^{th}$ CD-group. Each A-switch has five inputs, which are also inputs of the entire switching network and two outputs. The remaining switches have each two inputs and two outputs, the outputs of the D-switches being also outputs of the entire switching network. Each input of a switch can be connected, in this switch, to each output thereof. The input $(x, y, z)$ is the $x^{th}$ input of the switch $A_{yz}$; the output $(u, v, w)$ is the $w^{th}$ output of the switch $D_{uv}$. The outputs of the switches of a stage are connected through links to the inputs of the switches of the next stage, so that there are three kinds of links, which are referred to as AB-links, BC-links and CD-links and are distinguished from one another by one, two and three accents, respectively. The link pattern is as follows: the $p^{th}$ output of the switch $A_{yz}$ is connected, through the AB-link $(y, p, z)'$, to the $y^{th}$ input of the switch $B_{zp}$; the $u^{th}$ output of the switch $B_{zp}$ is connected, through the BC-link $(z, p, u)''$, to the $z^{th}$ input of the switch $C_{pu}$; the $v^{th}$ output of the switch $C_{pu}$ is connected, through the CD-link $(u, p, v)'''$ to the $p^{th}$ input of the switch $D_{uv}$. Due to this link pattern, a channel having the channel number $p$ and comprising the links $(y, p, z)'$, $(z, p, u)''$ and $(u, p, v)'''$, connects the input $(x, y, z)$ to the output $(u, v, w)$ of the switching network. It will be appreciated that the link pattern described is independent of the number of switches per group and of the number of groups. In the switching network shown, which for the sake of clarity has been kept very simple, the concentration is effected in the A-stage only. The remaining stages serve to ensure that there exist channels from each input to each output. While retaining the above-described link pattern, the switching network may alternatively be designed so that a certain concentration is effected in some of the remaining stages. However, it will be appreciated that a switching network having this link pattern satisfies the above requirements with respect to the channels. The middle co-ordinate of the address of each link is the channel number. Since each input of an A-switch can be connected, in this switch, to each output thereof, while the same applies to the D-switches, the channels can be regarded as connections between an A-switch and a D-switch. This is the reason why the addresses of the link forming the channels between the input $(x, y, z)$ and the output $(u, v, w)$ are independent of the co-ordinates $x$ and $w$.

Figure 2:
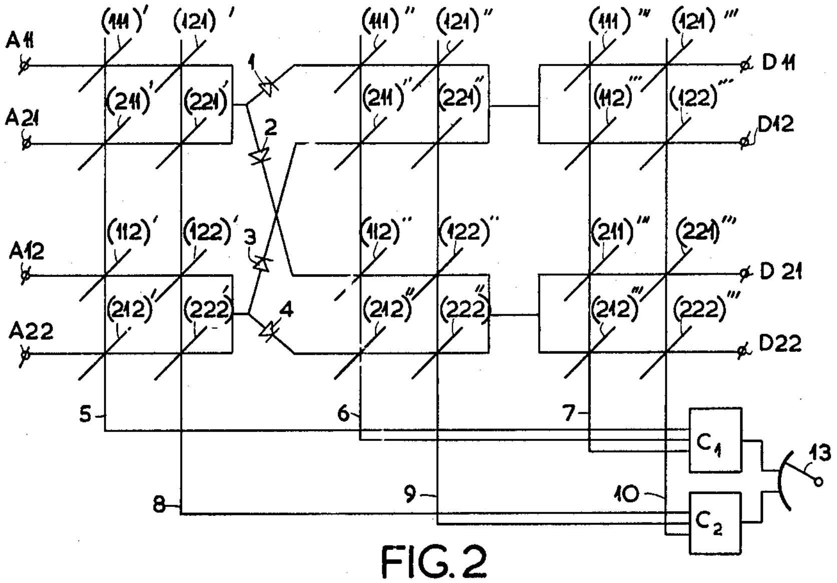
FIG. 2 shows the fundamental structure of a link memory for the switching network shown in FIG. 1.

FIG. 2 shows the fundamental structure of a link memory system for the switching network shown in FIG. 1. The binary memory elements are rings made of rectangular magnetic material. They are indicated in FIG. 2 by the addresses of the corresponding links. The rings which correspond to the AB-links, are arranged in a matrix, and likewise the rings corresponding to the BC- and the CD-links. In FIG. 2 each A-switch and each D-switch corresponds to a terminal which is designated by the symbol of the switch concerned. The read-out wires are wires which are threaded through the rings and are shown in FIG. 2 as horizontal lines. The terminal $A_{yz}$ is connected to a read-out wire threaded through the rings $(y, 1, z)'$ and $(y, 2, z)'$, the terminal $D_{uv}$ to a read-out wire threaded through the rings $(u, 1, v)'''$ and $(u, 2, v)'''$. Furthermore, a read-out wire is threaded through each pair of rings $(z, 1, u)''$ and $(z, 2, u)''$. The various read-out wires are connected together in the manner shown in the figure and the wires connecting the read-out wires of the AB link matrix and the read out wire of the BC link matrix each contain a diode having a pass direction from the A-terminal to the D-terminal. These diodes are designated in the figure by the reference numbers 1, 2, 3 and 4. If, now, the terminal $A_{yz}$ is connected to the positive terminal, and the terminal $D_{uv}$ to the negative terminal, of a battery, a current traverses the read-out wires threaded through the cores $(y, 1, z)'$, $(y, 2, z)'$, $(z, 1, u)''$, $(z, 2, u)''$, $(u, 1, v)'''$, $(u, 2, v)'''$ while the diodes 1, 2, 3 and 4 prevent the formation of parallel current paths. A signal wire is threaded through the rings of any one column of a matrix the addresses of which have the same channel number. In FIG. 2, there are six signal wires, 5, 6, 7, 8, 9, 10, the first three of which refer to links having the channel number 1 and the last three to links having the channel number 2. The signal wires 5, 6 and 7 are connected to a triple coincidence circuit $C_1$ and the wires 8, 9, 10 to a triple coincidence circuit $C_2$. The coincidence circuits $C_1$ and $C_2$ are scanned by a scanning circuit 13. The latter is shown symbolically in FIG. 2 as a rotary switch.

Each ring can be in two magnetic conditions which hereinafter will be referred to as states and will be designated by the digits 0 and 1. The state 0 corresponds to a free link and the state 1 to a busy link.

The link memory shown in the figure operates as follows. It is assumed that a channel is to be built up between the switches $A_{21}$ and $D_{22}$. The terminal $A_{21}$ of the link memory system is connected to the positive terminal, and the terminal $D_{22}$ to the negative terminal, of a current source capable of supplying a current of sufficient strength to cause the rings to flip over. As a result, the rings $(2, 1, 1)'$, $(2, 2, 1)'$, $(1, 1, 2)''$, $(1, 2, 2)''$, $(2, 1, 2)'''$, and $(2, 2, 2)'''$ are all driven to the state 1. However, of these rings only these flip over which previously were in the state 0, that is to say, the rings corresponding to free links. Only the ring flipping over provide a pulse in the signal wire threaded through them. It is assumed, for example, that the links $(2, 1, 1,)'$, $(2, 2, 1)'$, $(1, 2, 2)''$, $(2, 2, 2)'''$ are free so that the corresponding rings are in the state 0, while the links $(1, 1, 2)''$, and $(2, 1, 2)'''$ are busy so that the corresponding rings are in the state 1. The current flowing through the wire which connects the terminal $A_{21}$ through the diode 2 to the terminal $D_{22}$, causes the rings $(2, 1, 1)'$, $(2, 2, 1)'$, $(1, 2, 2,)''$, $(2, 2, 2)'''$ to flip over so that pulses are produced in the signal wires 5, 8, 9 and 10. Hence, the coincidence circuit $C_1$ receives only a single pulse (through the wire 5), however, the coincidence circuit $C_2$ receives three pulses (through the wires 8, 9 and 10). Consequently, when the scanning circuit 13 reaches the output of the coincidence circuit $C_2$, it receives the information that a coincidence has taken place. This corresponds to the information: "the channel 2 between the switches $A_{21}$ and $D_{22}$ is free." This explains the principle on which a link memory can be built which is capable of performing the principal function, that is to say, a function of providing information about a free channel between a certain input and a certain output. Furthermore, it will be appreciated that the circuit arrangement can be designed so that any ring may be sent to the state 0 or to the state 1, for example, by coincidence.

Figure 3:
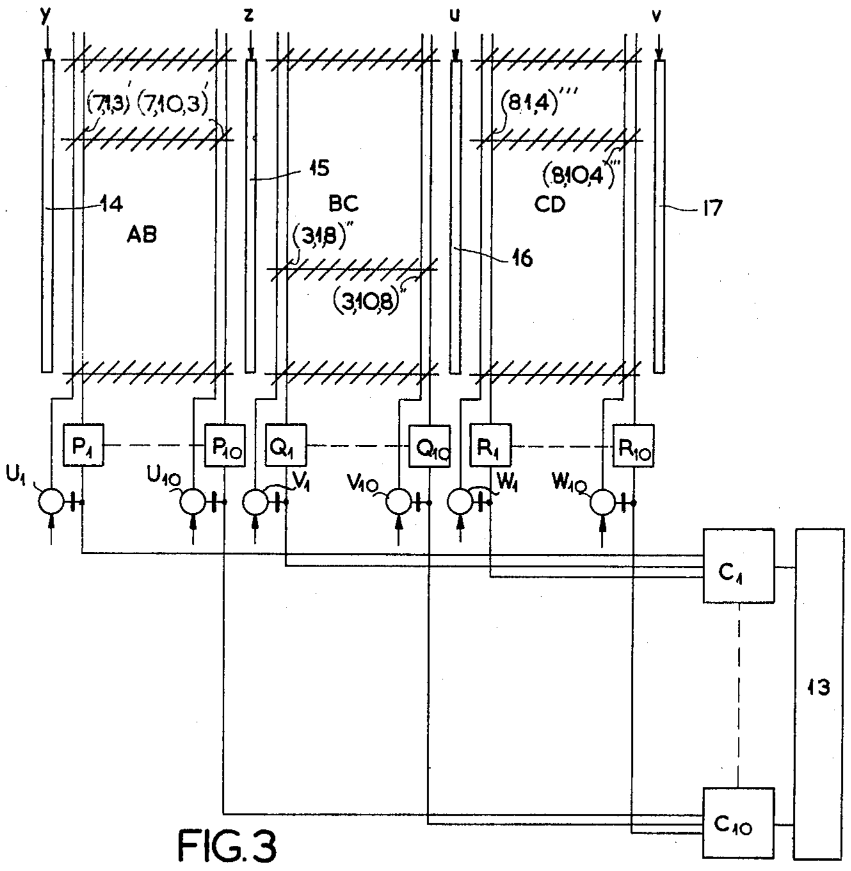
FIG. 3 shows the fundamental structure of a link memory of an exchange having approximately 5,000 subscriber's lines.

FIG. 3 shows the fundamental structure of the link memory of an exchange serving approximately 5,000 subscribers. As an example, it is assumed that each A-switch has 50 inputs and 10 outputs. Thus, there are 100 A-switches. The A- and B-switches are subdivided into 10 AB-groups each comprising 10 A-switches and 10 B-switches. The switching network also has 10 CD-groups each comprising 10 C-switches and 10 D-switches. The B-, C- and D-switches each have 10 inputs and 10 outputs. In this event, there are 1,000 AB-links, 1,000 BC-links and 1,000 CD-links. There are 10 channels between each A-switch and each D-switch.

The rings corresponding to the AB-links are arranged in a matrix in which the rings $(y, p, z)'$, which have the same values of the co-ordinates $y$ and $z$ but in which $p$ assumes the values 1, 2 . . . 10, are arranged in a row, while all the rings for which the co-ordinate $p$ has the same value are arranged in a column. The rings corresponding to the BC-links and the CD-links are similarly arranged in a BC-matrix and a CD-matrix. For the sake of simplicity, only three rows of rings of each matrix are shown. In FIG. 3, reference numerals 14, 15, 16 and 17 denote members which can receive the value of a co-ordinate as input information, $P_1 \ldots P_{10}$, $Q_1 \ldots Q_{10}$, $R_1 \ldots R_{10}$ denote pulse amplifiers, $U_1 \ldots U_{10}$, $V_1 \ldots V_{10}$, $W_1 \ldots W_{10}$ denote cocking gates, $C_1 \ldots C_{10}$ denote triple coincidence circuits, and 13 denotes a scanning circuit. The term "cocking gate" is used herein to denote a circuit comprising a cocking terminal, a firing terminal and an output terminal. In FIG. 3, a cocking gate is shown by a circle, its cocking terminal by a cross line and the firing terminal by an arrow pointing towards the circle (see, for example, $U_1$). If a pulse of a certain polarity is applied to the cocking terminal and subsequently a pulse of a certain polarity is applied to the firing terminal, the cocking gate produces an output pulse of a sharply defined shape. However, if a pulse is applied to the firing terminal of a cocking gate which has not been cocked, this gate supplies no output pulse. A circuit of a cocking gate is described in co-pending specification Serial No. 793,522, filed February 16, 1959, now Patent No. 3,012,151.

The link memory shown in FIG. 3 operates as follows. It is assumed that a free channel is wanted between the switches $A_{73}$ and $D_{84}$. For this purpose, information about the co-ordinate $y=7$ must be supplied to the member 14, information about the co-ordinate $z=3$ to the member 15, information about the co-ordinate $u=8$ to the member 16 and information about the co-ordinate $v=4$ to the member 17. These members are designed so that at an instant $t_1$ pulses of value $i$ which drive to the state 1 are passed through the rows of rings $(7, 1, 3)' \ldots (7, 10, 3)'$, $(3, 1, 8)'' \ldots (3, 10, 8)''$, $(8, 1, 4)''' \ldots (8, 10, 4)'''$. As a result, the rings which had not yet been set to the state 1, are now caused to pass to this state 1. The value of $i$ is such that a pulse of value $i$ causes a ring to change its state with certainty, whereas a pulse of value $\frac{1}{2}i$ with certainty does not cause such a change. Pulses driving to the state 1 are regarded as positive and pulses driving to the state 0 as negative. If, for example, the channel 5 was free, that is to say, if the rings $(7, 5, 3)'$, $(3, 5, 8)''$ and $(8, 5, 4)'''$ were in the state 0, these rings are now caused to pass from the state 0 to the state 1. The resulting signal pulses are amplified in the pulse amplifiers $P_5$, $Q_5$ and $R_5$, so that (possibly at a slightly later instant $t_2$) the cocking gates $U_5$, $V_5$ and $W_5$ are cocked and the coincidence circuit $C_5$ detects a coincidence. If, now, the scanning circuit 13 reaches the coincidence circuit $C_5$, it receives the information that $C_5$ has detected a coincidence and hence remains on $C_5$. As a result, at an instant $t_3$ pulses are applied by the scanning circuit 13 to the firing terminals of the cocking gates $U_5$, $V_5$ and $W_5$ through wires which are not shown for the sake of simplicity. The cocking gates $U_5$, $V_5$ and $W_5$ are fired and produce negative pulses of value $\frac{1}{2}i$ which drive in the negative direction. However, at the instant $t_3$ no change in the states of the rings of the matrices is caused thereby. The fact that the scanning switch 13 has stopped on the coincidence circuit $C_5$, however, corresponds to the information that the channel 5 between the switches $A_{73}$ and $D_{84}$ is free. At an instant $t_4$ subsequent to the instant $t_3$, pulses are applied to the firing terminals of all the cocking gates $U_1 \ldots U_{10}$, $V_1 \ldots V_{10}$, $W_1 \ldots W_{10}$, while simultaneously the members 14, 15, 16 and 17 pass negative pulses of value $\frac{1}{2}i$ through the rows of rings $(7, 1, 3)' \ldots (7, 10, 3)'$, $(3, 1, 8)'' \ldots (3, 10, 8)''$, $(8, 1, 4)''' \ldots (8, 10, 4)'''$. As a result, all the rings of the link memory abruptly return to their initial states with the exception of the rings relating to the channel concerned bearing the channel number 5, which rings initially were in the state 0 but on termination are in the state 1. This will be obvious with respect to the rings not associated with the channels concerned, since these rings remain in their initial states throughout the entire cycle. At the instant $t_1$, the ring $(7, 5, 3)''$ abruptly passes from the state 0 to the state 1, however, at the instants $t_3$ and $t_4$ it remains in the state 1, since at these instants only a single pulse of value $\frac{1}{2}i$ driving to the state 0 is applied to it. The ring $(7, q, 3)'$ $(q \neq 5)$, however, at the instant $t_1$ either passes from the state 0 to the state 1 or remains in the state 1. In the former case, the cocking gate $U_q$ is cocked at the instant $t_2$ and fired at the instant $t_4$. At this latter instant, however, the ring $(7, q, 3)'$ abruptly returns to the initial state 0, since at this instant two coincident pulses of value $\frac{1}{2}i$ driving to the state 0 are applied to it. In the latter case, the ring $(7, q, 3)'$ does not flip over at the instant $t_1$, so that the cocking gate $U_q$ is not cocked and hence cannot be fired subsequently. In this event, the ring $(7, q, 3)'$ remains in the state 1 at the instants $t_3$ and $t_4$, since no pulse is applied to it at the former instant and only a single pulse of value $\frac{1}{2}i$ driving to the state 0 is applied to it at the second instant.

Figure 4:
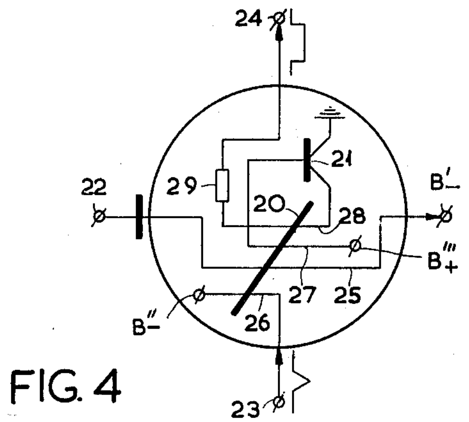
FIG. 4 shows the circuit diagram of a cocking gate.

FIG. 4 is a diagram of a cocking gate. In this figure, reference numeral 20 denotes an annular core of a rectangular magnetic material, 21 a transistor of the p-n-p type, 22 a cocking terminal, 23 a firing terminal, 24 an output terminal, 25 a cocking winding, 26 a firing winding, 27 a control winding and 28 an output winding. One end of the cocking winding 25 is connected to the cocking terminal 22 and the other end to a negative voltage supply $B_-'$. One end of the firing winding 26 is connected to the firing terminal 23 and the other end to a negative voltage supply $B_-''$. One end of the control winding 27 is connected to the base of the transistor 21 and the other end to a positive voltage terminal $B_+'''$. One end of the output winding 28 is connected through a resistor 29 to the output terminal 24 and the other end to the colletcor of the transistor 21. The emitter of the transistor 21 is grounded. For the sake of simplicity, each winding is shown as a single conductor threaded through the annular core 20, however, in actual fact each winding comprises a greater or lesser number of turns provided on the core 20. The winding directions of the various windings are shown in the figure.

The circuit operates as follows. If a current pulse of sufficient strength is applied to the cocking terminal 22, the core 20 is driven into a certain magnetic condition which will be referred to hereinafter as the condition 1. It is assumed that this pulse, hereinafter referred to as cocking pulse, is directed towards the cocking terminal. The duration of the cocking pulse must be sufficient to cause the core 20 to pass entirely from the condition 0 to the condition 1. Then a pulse, which may be very short, is applied to the firing terminal 23 so that the core 20 is caused to pass to the condition 0. This pulse, which hereinafter will be referred to as the firing pulse, must have sufficient strength for a voltage to be induced in the control winding by the core 20 starting to flip over, which voltage overcomes the positive bias voltage set up at the base of the transistor 21 by the positive voltage supply $B_+'''$, so that the transistor is rendered conductive. However, as a result, a current flows to the output winding 28 which also drives the core 20 to the condition 0. Hence, if the firing pulse is terminated before the core 20 has reached the condition 0, the core 20 is caused to pass completely to the condition 0 by the current which is passed through the output winding 28 by the transistor 21.

Figure 5:
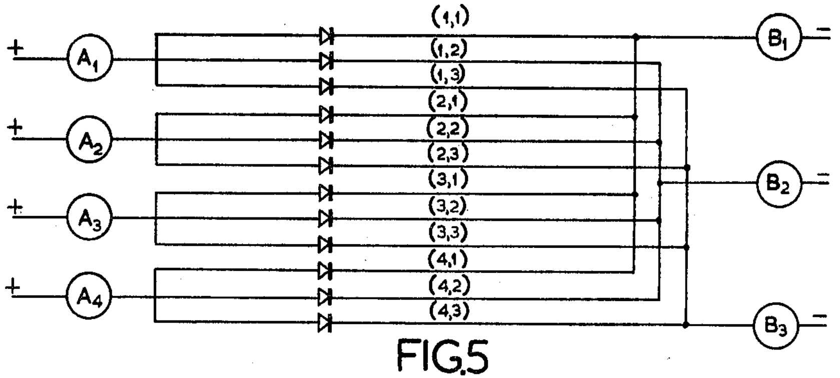
FIG. 5 shows the principle of a circuit arrangement by means of which a current can be sent through one of a number of wires.

FIG. 5 shows the principle of the control of the read-out wires of the various matrices of the link memory.

The figure relates to a very simple case of twelve wires which are determined by the two co-ordinates $\alpha$ and $\beta$, where $\alpha$ can have the values 1, 2, 3 and 4 and $\beta$ the values 1, 2 and 3. At the left-hand side of the drawing, the wires $(\alpha,1)$, $(\alpha,2)$, $(\alpha,3)$ are connected to a gate $A_\alpha$ and at the right-hand side the wires $(1,\beta)$, $(2,\beta)$, $(3,\beta)$, $(4,\beta)$ are connected to a gate $B_\beta$. In each wire there is connected a rectifier having a pass direction from a gate $A_\alpha$ to a gate $B_\beta$. If the gates $A_\alpha$ and $B_\beta$ are opened, a current can flow through the wire $(\alpha,\beta)$ while the rectifiers prevent the flow of a current through any of the remaining wires. The gates used can be the cocking gates described hereinbefore which are preferably improved in the manner described in co-pending application Serial No. 826,524, filed July 13, 1959, now Patent No. 3,015,742.

Figure 6:
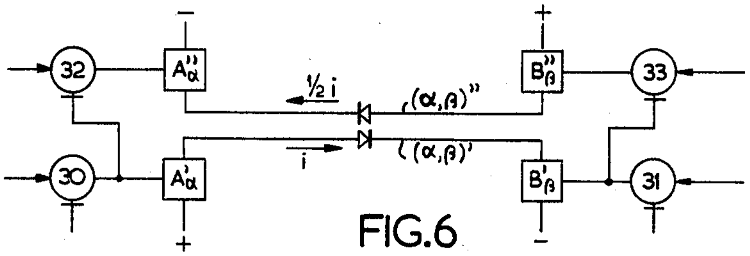
FIG. 6 shows the principle of the combined control of the read-out and write-back wires of the link book-keeping system.

From the description of FIG. 3, it appeared that the matrices must be controlled so that the rings of a row must first be driven to the state 1 by a pulse of value $i$ and then to the state 0 by a pulse of value $\frac{1}{2}i$. This may be effected in the manner shown in FIG. 6. The pulse of value $i$ passes through the gates $A'_\alpha$ and $B'_\beta$, the pulse of value $\frac{1}{2}i$ passes through the gates $B''_\beta$ and $A''_\alpha$. The gate $A'_\alpha$ is opened by firing a cocking gate 30, the gate $A''_\alpha$ is opened by firing a cocking gate 32. Similarly, the gates $B'_\beta$ and $B''_\beta$ are opened by firing the cocking gates 31 and 33. However, the pulse produced by firing the cocking gate 30 is also applied as a cocking pulse to the cocking gate 32 and similarly the pulse produced by firing the cocking gate 31 is applied as a cocking pulse to the cocking gate 33. If the cocking gates 30 and 31 are cocked, the simultaneous firing of these gates causes the gates $A'_\alpha$ and $B'_\beta$ to be opened momentarily and the cocking gates 32 and 33 to be cocked. The gates $A'_\alpha$ and $B'_\beta$ can be designed so that the pulse which flows through the wire $(\alpha,\beta)'$ owing to these gates being opened, has the value $i$ and a direction to the right. If subsequently firing pulses are applied to the cocking gates 32 and 33, these gates produce pulses which open the gates $A''_\alpha$ and $B''_\beta$ momentarily. These gates are designed so that the pulse which due to their opening passes through the wire $(\alpha,\beta)''$, has the value $\frac{1}{2}i$ and a direction to the left.

Figure 7:
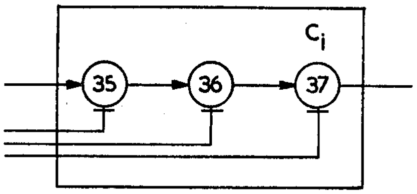
FIG. 7 shows the circuit diagram of a triple coincidence circuit.

The coincidence circuits $C_i$ (FIG. 3) can be designed in the manner shown in FIG. 7. The circuit shown in this figure comprises three-series connected cocking gates 35, 36, 37 which are cocked by the pulses supplied by the pulse amplifiers $P_p$, $Q_p$, $R_p$. When the cocking gate 35 is cocked and subsequently fired, the pulse supplied by this gate can only fire the cocking gate 36 if the latter was likewise cocked. The pulse supplied by the cocking gate 36 can again fire the cocking gate 37 only if this latter was cocked. Thus, firing the cocking gate 35 provides an output pulse only if all three cocking gates 35, 36 and 37 were cocked. Obviously, two of the three cocking gates 35, 36 and 37 can be replaced by a single cocking gate which must be cocked in coincidence. Preferably, in the cocking gate, use is made of the improvement described in co-pending Patent No. 3,015,742.

The scanning circuit 13 (FIG. 3) is a circuit which fires the initial cocking gates of the coincidence circuits $C_i$ in sequence and stops when a coincidence circuit supplies an output pulse. By not imparting a fixed initial position to the scanning circuit 13, so that the coincidence circuits $C_i$ are scanned in cyclic sequence, a certain element of arbitrariness is introduced in the choice of a channel number.

Figure 8:
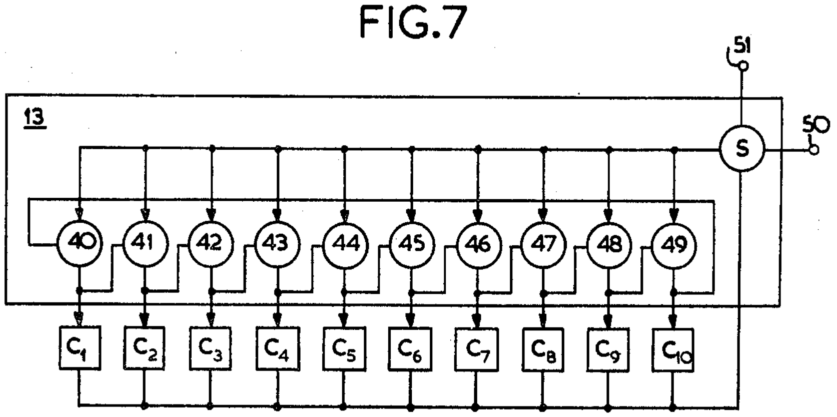
FIG. 8 shows the circuit diagram of a scanning device.

FIG. 8 shows the circuit diagram of a possible embodiment of the scanning circuit. The scanning circuit shown in this figure substantially comprises ten cocking gates 40, 41, 42, 43, 44, 45, 46, 47, 48, 49 and a gate S. The firing terminals of these cocking gates are connected through the gate S, to a terminal 50 to which a continuous pulse train is applied. Furthermore, the output terminal of each cocking gate is connected not only to the firing terminal of the corresponding coincidence circuit $C_i$ but also to the cocking terminal of the next subsequent cocking gate, the output terminal of the last cocking gate 49 being connected to the cocking terminal of the first cocking gate 40. The output terminals of the coincidence circuits $C_i$ are connected to a control terminal of the gate S.

This circuit arrangement operates as follows. At a certain instant, only a single of the ten cocking gates 40 . . . 49 is cocked, for example the cocking gate 43. Now the gate S is opened by applying a pulse to a control terminal 51. When the next subsequent pulse is applied to the terminal 50, the cocking gate 43 is fired and consequently the cocking gate 44 is cocked and a firing pulse is applied to the coincidence switch $C_4$. If the latter has detected a coincidence, a pulse is applied to a control terminal of the gate S, so that this gate closes and the scanning circuit stops and remains in the position $p=4$. This means that the channel $p=4$ is free. If the coincidence circuit $C_4$ has not detected a coincidence, it delivers no output pulse so that the gate S remains open. By the next subsequent pulse applied to the terminal 50, the cocking gate 44 is fired. If the coincidence circuit $C_5$ has detected a coincidence, it provides a pulse which closes the gate S so that the scanning circuit stops and remains in the position $p=5$, which means that the channel $p=5$ is free. If the coincidence circuit $C_5$ has not detected a coincidence, it does not deliver an output pulse and the gate S remains open. This process is repeated until a free channel has been found. By applying a pulse to the second control terminal 51 of the gate S, the latter is opened again so that a channel can be hunted for to establish another connection. Obviously, the scanning device must be provided with a counter which gives a signal closing the gate S when ten coincidence circuits have been scanned without one of these coincidence circuits having detected a coincidence. This signal also means that no channel is free. If this measure were not taken, the scanning device would continue scanning despite the fact that this cannot lead to a result.

Although hereinbefore the invention is described with reference to a switching network built up from switching matrices, the invention can be applied with the same success to the controlling of a switching network built up from two-motion selectors and rotary selectors or mechanical or electronic equivalents thereof, for each set of multipled selectors of these types is equivalent to a switching matrix.

What is claimed is:

1. A telecommunication exchange comprising a switching network having a plurality of input terminals and a plurality of output terminals, said network comprising a plurality of switch means and a plurality of link means interconnected to form a plurality of channels between each input terminal and output terminal, the coordinates of the addresses of said links between given input and output terminals depending according to a fixed law upon the coordinates of the addresses of said given input and output terminals and the number of the channel extending therebetween, and a memory device for storing information indicative of the states of said link means comprising a plurality of binary memory elements, each of said elements corresponding to a link of said network, means connecting elements corresponding to links having addresses differing only in the coordinate relating to channel number to common read out wire means, and means connecting elements corresponding to links having the same channel number to common signal wire means.

2. A telecommunication exchange comprising a switching network having a plurality of input terminals and a plurality of output terminals, said network comprising a plurality of switch means and a plurality of links interconnected to form a plurality of channels between each input and output terminal, the coordinates of the address of said links between given input and output terminals depending according to a fixed law upon the coordinates of the addresses of said given input and output terminals and the number of the channel extending therebetween, and a memory device for storing information indicative of the states of said links comprising a plurality of binary memory elements, each of said elements corresponding to a link of said network, said element having first and second states, means connecting elements corresponding to links having addresses differing only in the coordinate relating to channel number to common read out wire means, means connecting elements corresponding to links having the same channel number to common signal wires means, and means for selectively applying a signal to said read out wire means to change the state of all elements in said first state connected thereto to said second state.

3. The telecommunication exchange of claim 2, in which said links are subdivided into at least two groups of links of the same type, said memory elements being arranged in a plurality of matrices, the memory elements corresponding to links of the same group being arranged in the same matrix, the memory elements of said matrix which differ from one another only in the coordinate relating to channel number being arranged in a row and the memory elements corresponding to the same channel being arranged in a column, said read out wire means being connected to elements in the same row and said signal wire means being connected to elemets in the same column, a plurality of coincidence circuit means, the signal wire means of said matrices corresponding to the same channel being connected to the same coincidence circuit means, and means for scanning said coincidence circuit means to detect a coincidence.

4. The telecommunication exchange of claim 3, comprising a plurality of write back wire means each being connected to the elements of a separate column of each of said matrices, a plurality of cocking gate means each having a cocking terminal, a firing terminal and an output terminal, said signal wire means and write back wire means of each column being connected respectively to the cocking and output terminals of a cocking gate, the output signals of said cocking gate means being insufficient to change the state of said elements.

5. The telecommunication exchange of claim 4, comprising means for applying firing signals to the firing terminals of said cocking gate means corresponding to rows in which said scanning means has detected a coincidence, and means for subsequently simultaneously applying firing signals to the firing terminals of all said cocking gate means and a signal pulse to a given read out wire means, said output signal of said cocking gate means and said signal pulses being insufficient separately but sufficient when combined to change the state of said elements from said second state to said first state.

6. The telecommunication exchange of claim 4, in which said binary memory elements are rings of magnetic material having rectangular characteristics, said read out wire means, signal wire means and write back wire means being threaded through said rings, said elements being proportioned so that a current $i$ in the respective wire means is sufficient to change the state of said elements, while a current of $\frac{1}{2}i$ is insufficient to change the state of the respective elements, and said cocking gate means are proportioned to provide output signal currents of $\frac{1}{2}i$.

7. A memory system comprising a plurality of binary memory elements arranged in a plurality of rows and columns, a first set of conductors each of which is in cooperative relationship with the elements of a separate row, a second set of conductors each of which is in cooperative relationship with the elements of a separate column, said elements having first and second states, means selectively applying a first signal to one of said first conductors, said first signal having sufficient magnitude to change the state of all elements in the respective row from said first state to said second state, cocking gate means having output terminals, said cocking gate means providing output signals to said output terminals when fired, each of said second conductors being connected to the output terminal of a separate cocking gate means, means for selectively firing a cocking gate means connected to a predetermined second conductor, and means for subsequently simultaneosuly applying firing signals to all of said cocking gate means and second signals to said one first conductor, said output signals and second signals being insufficient separately and sufficient together to change the state of said elements from said second state to said first state.

8. A memory system comprising a plurality of binary memory elements arranged in a plurality of rows and columns, a first set of conductor means each of which is in cooperative relationship with the elements of a separate row, a second set of conductor means each of which is in cooperative relationship with the elements of a separate column, a third set of conductor means each of which is also in cooperative relationship with the elements of a separate column, said elements being proportioned to change state upon application thereto only of signals having a magnitude greater than $\frac{1}{2}x$, means selectively applying signals of $x$ magnitude to one of said first conductor means, a plurality of cocking gate means each having a cocking terminal, a firing terminal and an output terminal, said cocking gate means being proportioned to provide output signals of $\frac{1}{2}x$ magnitude, each conductor of said second and third sets of a given row being connected respectively to the cocking and output terminals of one of said cocking gate means, and means applying a firing signal to the firing terminal of one of said cocking gates and subsequently simultaneously applying a firing signal to all of said firing terminals and applying a signal of $\frac{1}{2}x$ magnitude to said one first conductor means.

9. A memory system comprising a plurality of binary memory elements arranged in a plurality of rows and columns, a first set of conductor means each of which is in cooperative relationship with the elements of a separate row, a second set of conductor means each of which is in cooperative relationship with the elements of a separate column, a third set of conductor means each of which is also in cooperative relationship with the elements of a separate column, said elements having first and second states, means selectively applying a first signal of one polarity to the first conductor in cooperative relationship with one of said rows whereby all elements in said row previously in said first state are driven to said second state, a plurality of cocking gate means each having a cocking terminal, a firing terminal and an output terminal, means connecting the conductors of said second and third sets in cooperative relationship with each column to the cocking and output terminals respectively of a cocking gate means whereby a change of state of an element from a said first to said second state produces a pulse in the second conductor of the respective column that cocks the respective cocking gate means, said cocking gate means providing second signals to said third conductors when fired, and means for selectively providing firing signals to one of said cocking gate means and subsequently simultaneously applying firing pulses to all of said firing terminnals and supplying a third signal to said first conductor, said second and third signals being of a polarity opposite said one polarity, and being sufficient together and insufficient separately to change the state of an element from said second state to said first state.

10. A memory system comprising a plurality of two dimensional matrices of binary memory elements, the elements of each of said matrices being arranged in rows and columns, a first set of conductors in each of said matrices, each conductor of which is in cooperative relationship with a separate row of elements, second and third sets of conductors in each of said matrices, each of said second and third sets having a conductor in cooperative relationship with a separate column, a plurality of cocking gates each having a cocking terminal, a firing terminal, and an output terminal, means connecting the conductors of said second and third sets of conductors of each row respectively to the cocking and output terminals of a cocking gate, said elements being proportioned to change state upon application thereto of a signal of $x$ magnitude and not to change state upon application thereto of a signal of $\frac{1}{2}x$ magnitude, coincidence means, the conductors of said second set of conductors of respective columns of said matrices being connected to common coincidence means, scanning means connected to scan said coincidence means to detect a coincidence, means for selectively applying pulses of $x$ magnitude to one first conductor of each of said matrices, said cocking gates being proportioned to provide output pulses of $\frac{1}{2}x$ magnitude, and means for firing said cocking gates corresponding to a coincidence gate in which a coincidence is detected and subsequently simultaneously applying firing signals to the firing terminals of all said cocking gates and applying signals of $\frac{1}{2}x$ magnitude to said one first conductor of each of said matrices.

References Cited by the Examiner

UNITED STATES PATENTS

| | | | |
|---|---|---|---|
| 2,614,169 | 10/1952 | Cohen et al. | 346—74 |
| 2,722,567 | 11/1955 | Davison et al. | 179—18 |
| 2,723,311 | 11/1955 | Malthaner et al. | 179—16 |
| 2,749,037 | 6/1956 | Stibitz | 179—7 |
| 2,769,865 | 11/1956 | Faulkner | 179—18 |
| 2,851,534 | 9/1958 | Bray | 179—18 |
| 2,910,674 | 10/1959 | Wittenberg | 340—174 |
| 2,953,778 | 9/1960 | Anderson et al. | 179—18 |
| 2,963,686 | 12/1960 | Spencer | 340—174 |
| 2,992,421 | 7/1961 | Whitney | 179—18 |
| 3,020,353 | 2/1962 | Hertman | 179—18 |

ROBERT H. ROSE, *Primary Examiner.*

WALTER L. LYNDE, *Examiner.*